(12) United States Patent
Zhao et al.

(10) Patent No.: US 10,907,768 B2
(45) Date of Patent: Feb. 2, 2021

(54) COMPOSITE PRESSURE VESSEL ASSEMBLY AND METHOD OF MANUFACTURING

(71) Applicant: UNITED TECHNOLOGIES CORPORATION, Farmington, CT (US)

(72) Inventors: Wenping Zhao, Glastonbury, CT (US); Ellen Y. Sun, South Windsor, CT (US); Paul F. Croteau, Columbia, CT (US); Justin R. Hawkes, Marlborough, CT (US); Andrzej Ernest Kuczek, Bristol, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 99 days.

(21) Appl. No.: 16/095,570

(22) PCT Filed: Apr. 22, 2016

(86) PCT No.: PCT/US2016/028953
§ 371 (c)(1),
(2) Date: Oct. 22, 2018

(87) PCT Pub. No.: WO2017/184173
PCT Pub. Date: Oct. 26, 2017

(65) Prior Publication Data
US 2019/0107251 A1    Apr. 11, 2019

(51) Int. Cl.
*F17C 1/04*    (2006.01)
*F17C 1/16*    (2006.01)
(Continued)

(52) U.S. Cl.
CPC .............. *F17C 1/04* (2013.01); *B29C 65/564* (2013.01); *B29C 70/70* (2013.01); *B29C 70/887* (2013.01);
(Continued)

(58) Field of Classification Search
CPC ...... F17C 1/00; F17C 1/14; F17C 1/02; F17C 1/16
See application file for complete search history.

(56) References Cited

U.S. PATENT DOCUMENTS

2004/0055897 A1*  3/2004  Lessing ............. H01M 8/04208
                                                 205/765
2014/0166664 A1*  6/2014  Lin .................. B60K 15/03006
                                                 220/562

FOREIGN PATENT DOCUMENTS

DE       19749950 A1    5/1999
WO       2016057024 A1  4/2016
WO       WO-2016057024 A1 *  4/2016   ............... F17C 1/16

OTHER PUBLICATIONS

ISR/WO, Issued Jan. 4, 2017 for related International Application No. PCT/US2016/028953; 12 pages.

* cited by examiner

*Primary Examiner* — Steven A. Reynolds
*Assistant Examiner* — Javier A Pagan
(74) *Attorney, Agent, or Firm* — Cantor Colburn LLP (57) ABSTRACT

A composite pressure vessel assembly includes a first vessel having a first inner layer and a second vessel having a second inner layer. An outer layer of the assembly is in contact with and substantially envelopes the first and second inner layers. A junction of the assembly has outer boundaries defined by segments of the first inner layer, the second inner layer and the outer layer. A cross-layered component of the assembly is disposed in the junction, the first and second (Continued)

inner layers and the outer layer for adding strength to the junction and restricting delamination.

19 Claims, 8 Drawing Sheets

(51) Int. Cl.
    *F17C 1/14*     (2006.01)
    *B29C 65/56*     (2006.01)
    *B29C 70/70*     (2006.01)
    *B29C 70/88*     (2006.01)
    *B29L 31/00*     (2006.01)

(52) U.S. Cl.
    CPC ................. *F17C 1/14* (2013.01); *F17C 1/16* (2013.01); *B29L 2031/7156* (2013.01); *F17C 2201/0152* (2013.01); *F17C 2201/0166* (2013.01); *F17C 2203/0604* (2013.01); *F17C 2203/0619* (2013.01); *F17C 2203/0636* (2013.01); *F17C 2203/0663* (2013.01); *F17C 2209/2109* (2013.01); *F17C 2209/225* (2013.01)

COMPOSITE PRESSURE VESSEL ASSEMBLY AND METHOD OF MANUFACTURING

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

CROSS-REFERENCE TO RELATED APPLICATIONS

This application claims the benefit of PCT/US2016/028953 filed Apr. 22, 2016, which is incorporated herein by reference in its entirety.

BACKGROUND

The present disclosure relates to a pressure vessel assembly and more particularly to a composite pressure vessel assembly having a cross-layered component at a junction.

Pressure vessels may serve as storage media (e.g., gas) for a wide variety of consumer, commercial, and industrial processes. In order to store sufficient mass of gas for any operation within a given volume, the gas is stored at high pressure. Traditionally, pressure vessels have a typical spherical or cylindrical design that evenly distributes stress in the containment perimeter. Unfortunately, such tanks do not use allocated space efficiently. For example, a spherical vessel fills a cubic space with about fifty-two percent efficiency, and a cylindrical vessel fills a rectangular volume with approximately seventy percent efficiency. More recent improvements in pressure vessels that generally conform to a rectangular volume may fill the space with about ninety percent efficiency relative to a true rectangular volume.

The designs of non-spherical/cylindrical pressure vessels to support high internal pressure are complex, including variable-curvature external surfaces and internal structure to transfer mechanical loads. The large size of a high conformable vessel and the complicated shapes makes manufacturing challenging. In addition, manufacturing needs to consistently provide reliable, high-volume, lightweight and low-cost constructions.

SUMMARY

A composite pressure vessel assembly according to one, non-limiting, embodiment of the present disclosure includes a first vessel including a first inner layer; a second vessel including a second inner layer; an outer layer being in contact with and substantially enveloping the first and second inner layers; a junction having outer boundaries defined by segments of the first inner layer, the second inner layer and the outer layer; and a cross-layered component disposed in the junction, the first and second inner layers and the outer layer.

Additionally to the foregoing embodiment, the first vessel includes a first liner defining a first chamber and the first inner layer substantially envelopes the first liner, and wherein the second vessel includes a second liner defining a second chamber and the second layer substantially envelopes the second liner.

In the alternative or additionally thereto, in the foregoing embodiment, the first and second vessels are aligned side-by-side with a portion of the first inner layer in contact with a portion of the second inner layer.

In the alternative or additionally thereto, in the foregoing embodiment, the portions and segments of the first and second inner layers are not in direct contact with the outer layer.

In the alternative or additionally thereto, in the foregoing embodiment, the first and second liners are made of a formable polymer material.

In the alternative or additionally thereto, in the foregoing embodiment, the first and second liners are metallic.

In the alternative or additionally thereto, in the foregoing embodiment, the junction is generally centered to a Y-shaped seam.

In the alternative or additionally thereto, in the foregoing embodiment, the junction is made of the same material as the outer layer.

In the alternative or additionally thereto, in the foregoing embodiment, the cross-layered component includes a plurality of rods.

In the alternative or additionally thereto, in the foregoing embodiment, at least a portion of the plurality of rods extend through the outer layer, the junction, and at least one of the first and second inner layers.

In the alternative or additionally thereto, in the foregoing embodiment, at least a portion of the plurality of rods extend through the outer layer and the first inner layer.

In the alternative or additionally thereto, in the foregoing embodiment, the first and second inner layers are made of a generally continuous fiber, and the outer layer is made of a random fiber fabric.

In the alternative or additionally thereto, in the foregoing embodiment, the first and second inner layers are made of a generally continuous fiber, and the outer layer is made of a weaved fiber fabric.

In the alternative or additionally thereto, in the foregoing embodiment, the first and second inner layers and the outer layer form a prepreg laminate when the rods are inserted into the laminate.

In the alternative or additionally thereto, in the foregoing embodiment, the cross-layered component is generally a continuous stitching extending through the outer layer and at least one of the first and second inner layers.

In the alternative or additionally thereto, in the foregoing embodiment, the cross-layered component is an inter-weave disposed between the outer layer and at least one of the first and second inner layers.

A method of manufacturing a composite pressure vessel assembly according to another, non-limiting, embodiment includes enveloping a first liner with a first fiber composite layer; enveloping a second liner with a second fiber composite layer; placing the first and second liners side-by-side such that portions of the at least first and second fiber composite layers are in contact with one-another; enveloping the first and second fiber composite layers with a third fiber composite layer; and applying a cross-layered component generally at junctions of the pressure vessel defined by segments of the first, second, and third fiber composite layers.

Additionally to the foregoing embodiment, the method includes curing a resin of the first, second, and third fiber composite layers after applying the cross-layered component.

In the alternative or additionally thereto, in the foregoing embodiment, the cross-layered component is Z-pins.

In the alternative or additionally thereto, in the foregoing embodiment, the cross-layered component is an inter-weave of fibers between the third fiber composite layer and at least one of the first and second fiber composite layers.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The detailed description explains embodiments of the invention, together with advantages and features, by way of example with reference to the drawings.

DETAILED DESCRIPTION OF THE INVENTION

Figure 1:
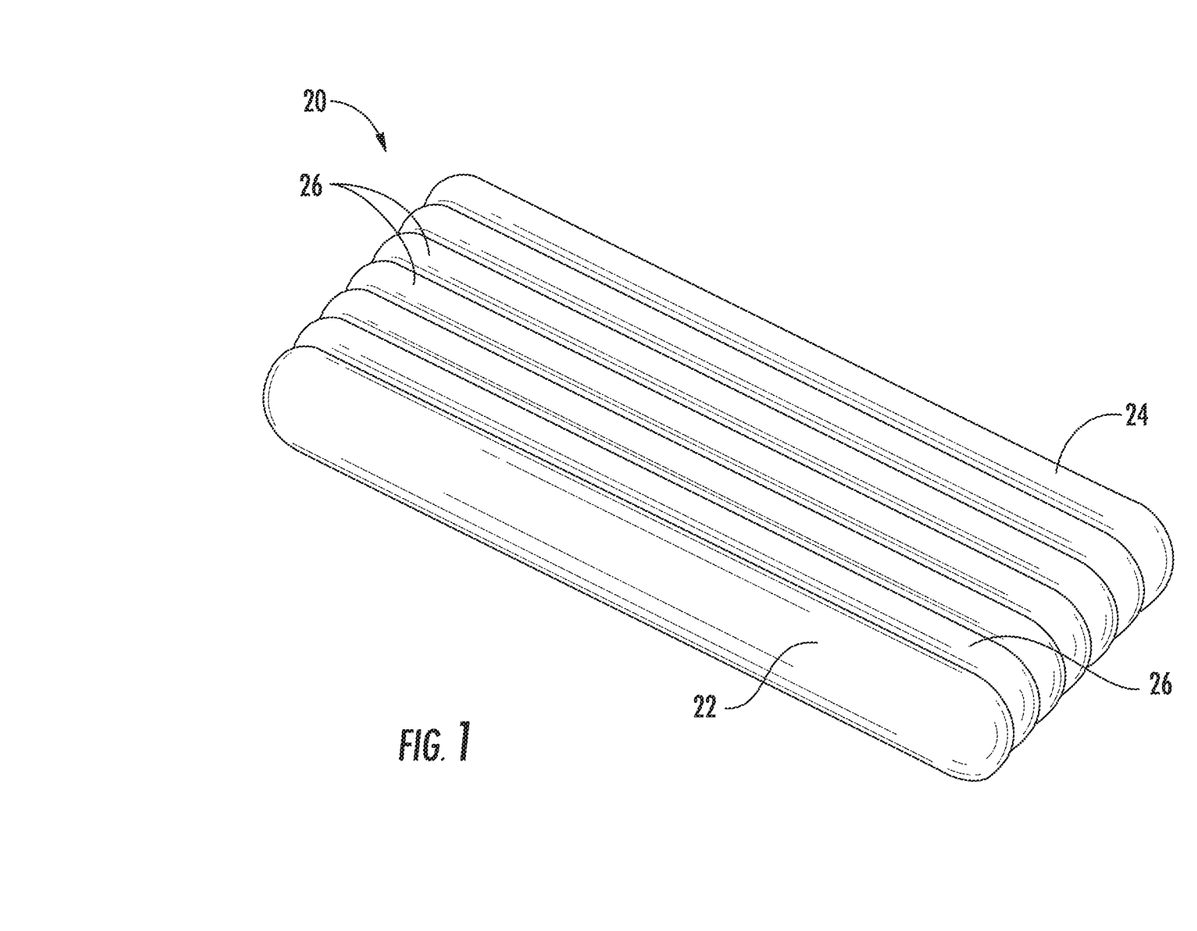
FIG. 1 is a perspective view of a pressure vessel assembly configured to store a pressurized fluid according to an exemplary embodiment of the invention.

Referring now to FIG. 1, an example of a pressure vessel or tank assembly 20 configured to store a high pressure fluid is illustrated. Exemplary fluids that may be stored within the pressure vessel 20 include, but are not limited to, compressed natural gas (CNG), hydrogen, propane, methane, air, and hydraulic fluid, for example. The pressure vessel assembly 20 may generally include two flanking vessels 22, 24 and at least one interior vessel 26 (e.g., five identical interior vessels illustrated) joined to and disposed between the flanking vessels 22, 24. Each vessel 22, 24, 26 may generally be elongated with the overall configuration of the pressure vessel assembly 20 generally being a rectangular shape, but as will be appreciated from the description, herein, other shapes are contemplated.

Figure 2:
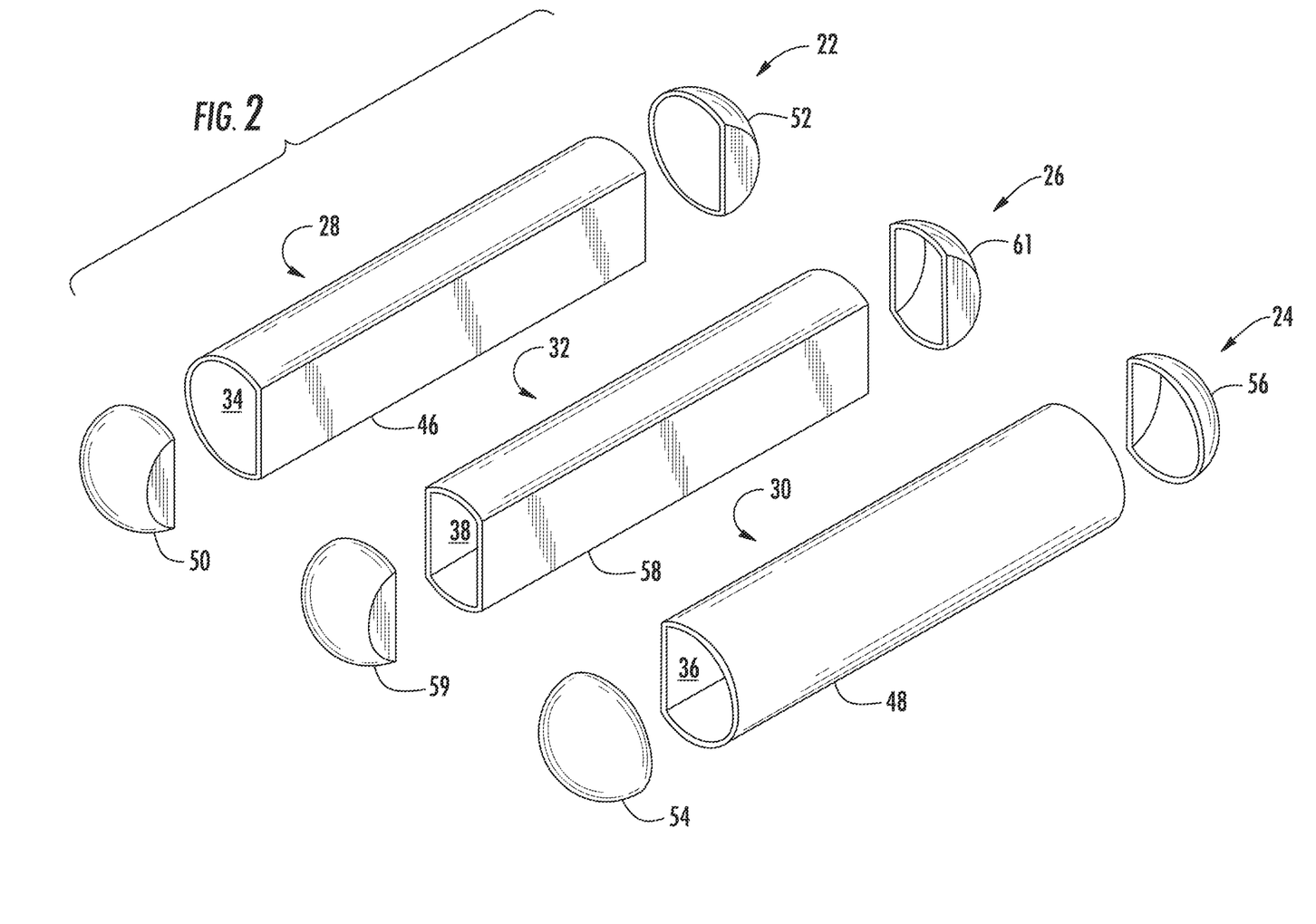
FIG. 2 is an exploded perspective view of liners of the pressure vessel assembly.
Figure 3:
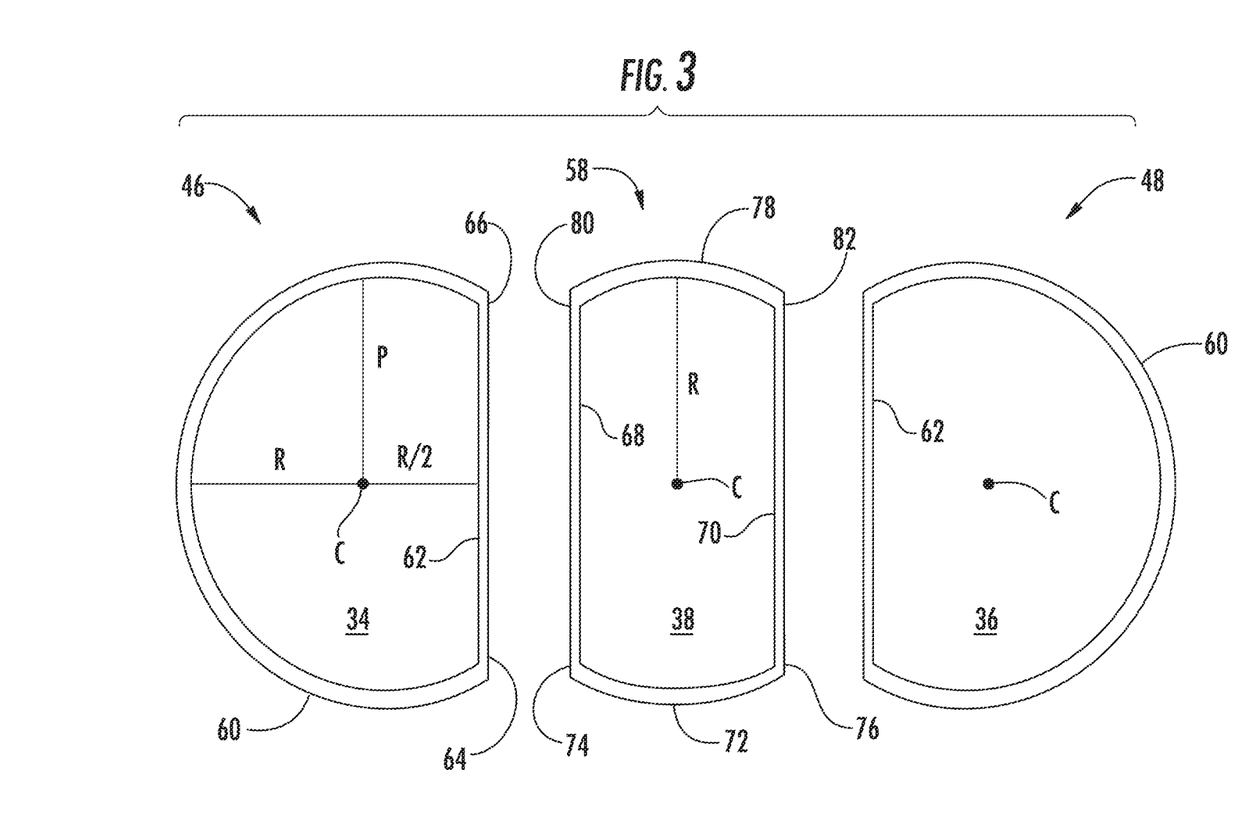
FIG. 3 is a cross section of the liners.

Referring to FIGS. 2 and 3, each vessel 22, 24, 26 may include respective liners 28, 30, 32. Each liner 28, 30, 32 may define the boundaries of respective chambers 34, 36, 38 for fluid storage. Although not shown, the chambers 34, 36, 38 may be in fluid communication with adjacent chamber(s). The flanking end liners 28, 30 may include respective lobes 46, 48 with lobe 46 closed-off by opposite end caps 50, 52 and lobe 46 closed-off by opposite end caps 54, 56. Each lobe 46, 48 may be circumferentially continuous and substantially cylindrical. The interior liner 32 may include a lobe 58 with the lobe 58 closed-off by opposite end caps 59, 61. Lobe 58 may be circumferentially continuous.

The liners 28, 30, 32 may be made of any material and thicknesses capable of providing the necessary structural support, weight, operating characteristics, cost limitations and other parameters necessary for a particular application. Examples of liner material may include steel or other metallic compositions and plastic such as thermoplastic, thermoset plastic or other formable structural polymer material. The liners 28, 30, 32 may further be blow molded plastic, or injection molded plastic.

Referring to FIG. 3, the lobes 46, 48 of the respective flanking liners 28, 30 may be substantially identical and are arranged such that the lobe 46 of the first flanking liner 28 is rotated about one-hundred and eighty (180) degrees relative to the lobe 48 of the opposite flanking liner 30 (i.e., are arranged as a mirror image of one-another). Each flanking lobe 46, 48 may include a generally cylindrical outer portion or wall 60 and an interior portion or wall 62. The interior wall 62 may be substantially planar and may laterally span between a first end 64 and a second end 66 of the cylindrical outer wall 60. In one embodiment, the interior wall 62 is integrally formed with the ends 64, 66 of the cylindrical outer wall 60. At least a portion of the curvature of the cylindrical outer wall 60 is defined by a radius R. In one embodiment, the portion of the outer wall 60, opposite the interior wall 62, includes a circular shape or curve generally spanning about two-hundred and forty (240) degrees with the radius R and about a centerline C. Consequently, the overall height of the flanking lobes 46, 48 is equal to double the length of the radius R of the cylindrical outer wall 60. The interior wall 62 (i.e., disposed vertically per the landscape illustrative perspective of FIG. 3) is generally parallel to and spaced apart from a vertical plane P that includes the origin of the radius R that defines the curvature of the outer wall 60. In one embodiment, the distance between the interior wall 62 and the parallel vertical plane P is about half the length of the radius R if the Y-joint is about one-hundred and twenty (120) degrees. As a result, the flanking lobes 46, 48 generally have a width equal to about one and a half the length of the radius of curvature R of the outer wall 60.

The illustrated interior lobe 58 includes first and second interior sidewalls 68, 70 that may be diametrically opposite one another, substantially vertically arranged (i.e., per the illustrative perspective of FIG. 3), and separated from one another by a distance. In one embodiment, the width of the interior lobe 58 is generally equal to the radius of curvature R of the end lobes 46, 48. The thicknesses of the first interior sidewall 68 and the second interior sidewall 70 may be identical and may be equal to the thickness of the interior wall 62 of the flanking lobes 46, 48. A first outside wall 72 extends between a first end 74 of the first interior sidewall 68 and a first end 76 of the second interior sidewall 70. Similarly, a second outside wall 78 extends between a second end 80 of the first interior sidewall 68 and a second end 82 of the second interior sidewall 70.

The curvature of the first outside wall 72 and the second outside wall 78 may be defined by a circular shape or curve generally of a sixty (60) degree angle by a radius R. In one embodiment, the radius of curvature R of the interior lobe 58 is substantially identical to the radius of curvature R of the flanking lobes 46, 48. Consequently, the distance between the first curved wall 72 and the second curved wall 78 is double the length of the radius of curvature R, and is therefore, substantially equal to the height of the flanking lobes 46, 48.

Figure 4:
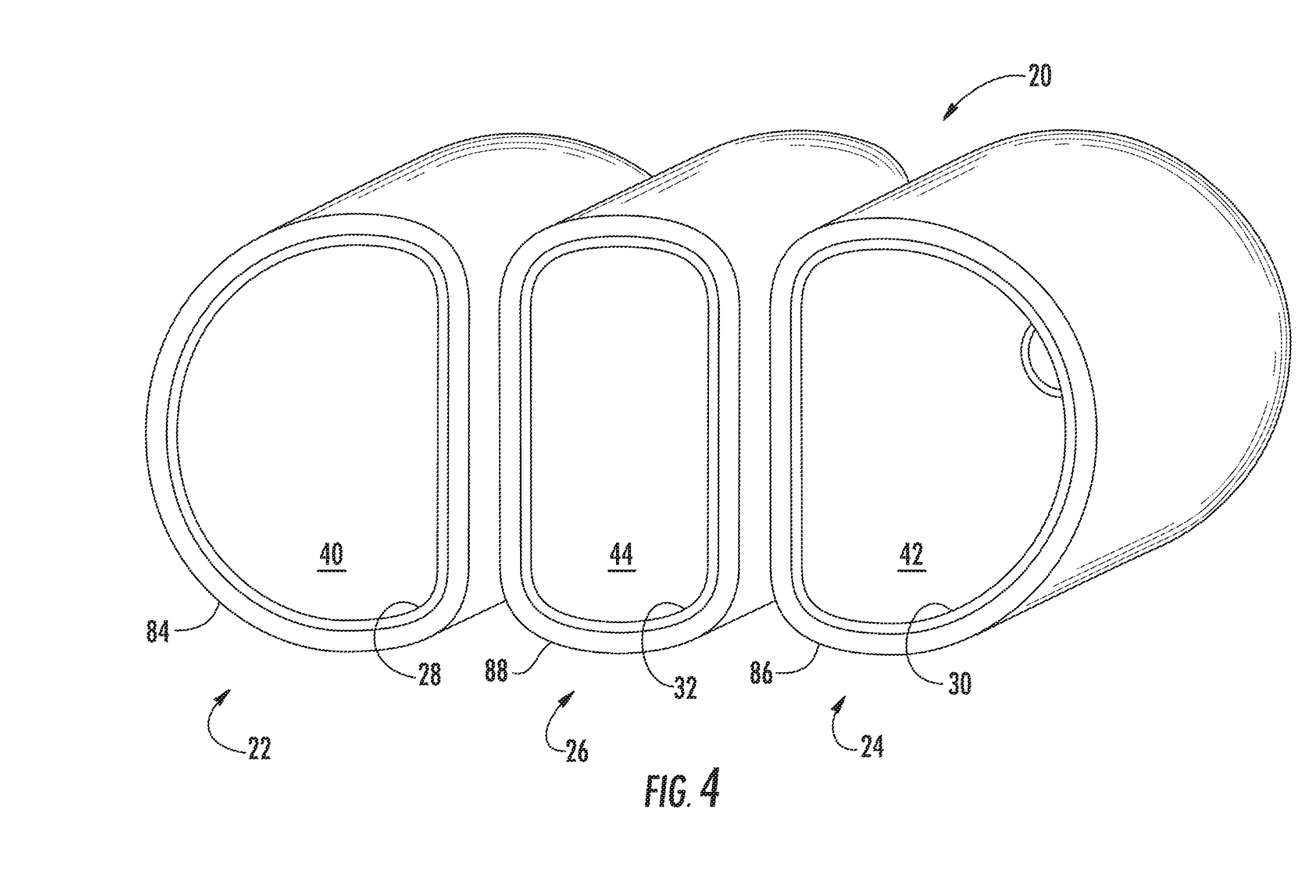
FIG. 4 is a perspective cross section of the liners with an inner-layer applied.

Referring to FIG. 4, the vessels 22, 24, 26 may include respective inner-layers 84, 86, 88 that substantially cover the respective liners 28, 30, 32. The inner-layers 84, 86, 88 may be a composite, and may be a continuous fiber wrapping or prepregs (i.e., fiber with resin) wrapped about the lobes and end caps of the liners for structural strength and for distributing internal stress. Alternatively, the inner-layers 84, 86, 88 may include a braiding that wraps about the respective liners 28, 30, 32. The primary reinforcement (i.e., the fibers or braiding), may be made of a carbon fiber, a glass fiber or an aramid fiber. A matrix material or resin for binding the continuous fibers may include epoxy, vinyl ester and other resin systems that may be nano-enhanced. It is further contemplated and understood that the inner-layers 84, 86, 88 may comprise other materials and/or processes including automated fiber placement, winded filaments, sprayed chopped fiber, and/or a mixture of continuous and non-continuous fiber.

When the composite vessel assembly 20 is at least partially assembled, the interior wall 62 of the flanking lobe 46 is opposed and in proximity to the interior sidewall 68 of the interior lobe 58. The portion of the inner-layer 84 covering the interior wall 62 may be directly adjacent to the portion of the inner-layer 88 that covers the sidewall 68. Moreover, the portion of the inner-layer 84 covering the interior wall 62 may be bonded to the portion of the inner-layer 88 that covers the sidewall 68 if, for example, prepreg is applied. Similarly, the interior wall 62 of the flanking lobe 48 is opposed and in proximity to the interior sidewall 70 of the interior lobe 58. The portion of the inner-layer 86 covering the interior wall 62 may be directly adjacent and adhered to the portion of the inner-layer 88 that covers the sidewall 70.

Figure 5:
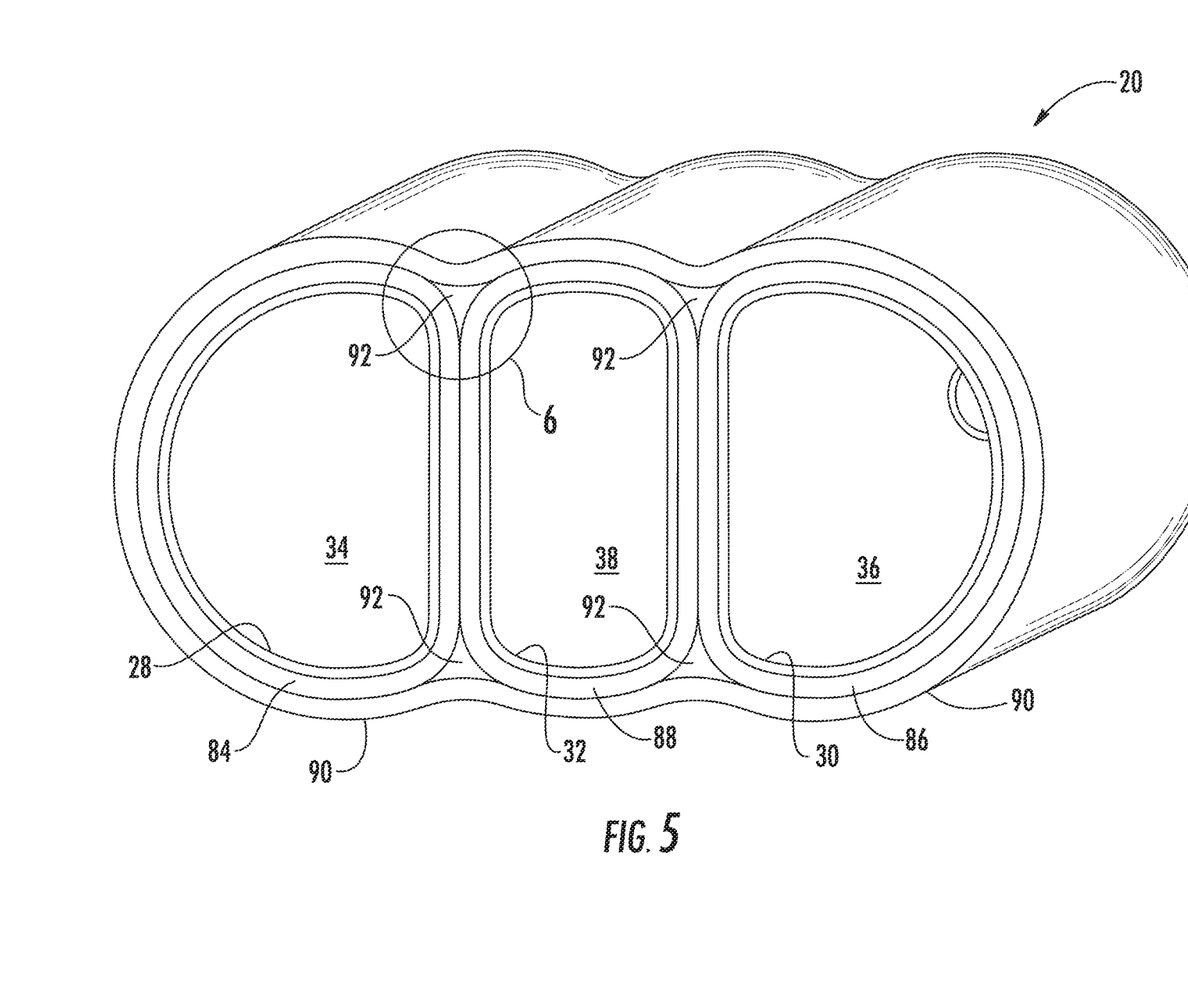
FIG. 5 is a perspective cross section of the pressure vessel assembly.

Referring to FIG. 5, the composite vessel assembly 20 may include an outer layer 90 that generally covers and envelops the inner-layers 84, 86, 88. The outer layer 90 may be applied after the inner-layers 84, 86, 88 are joined. The outer layer 90 may be a composite, and may be a mixture of a non-continuous (e.g., chopped) fiber and resin that may be spray applied (i.e., spray chop fiber/resin) or may be a sheet molding compound (SMC). The primary reinforcement (i.e., the chopped fibers), may be made of a carbon fiber, a glass fiber or an aramid fiber of about one (1) inch in length (2.5 cm). The resin for binding the chopped fibers may include epoxy, vinyl ester and other resin systems that may be nano-enhanced. It is contemplated and understood that the inner-layers 84, 86, 88 may also be similar in composition and application process as the outer layer 90.

The composite vessel assembly 20 may further include a plurality of junctions 92 with each junction located where respective ends of the outer walls 60, 72, 78, ends of the sidewalls 68, 70, and ends of interior walls 62 generally meet (also see FIG. 3). Each junction 92 may be generally triangular in cross section, and may generally be located at a center of a Y-shaped seam (i.e., where the inner and outer layers adhere to one another). The junction 92 may be made of the same material as the outer layer 90. When the vessels 22, 24, 26 are under internal pressure, areas proximate to and/or at the junctions 92 may be under significant through-thickness tensile stress that may challenge layered composite structures.

In one embodiment where continuous fiber is utilized for the inner-layers 84, 86, 88 and the chopped fiber is used for the outer layer 90, the vessel assembly 20 may be much lighter in weight than if the entire assembly were made with a chopped fiber. However, the internal structural sidewalls 68, 70 and internal walls 62 may have different thicknesses (e.g., about half as thick) than the outer walls 60, 72, 78 with the hybrid of continuous fiber and chopped fiber. For this embodiment of hybrid composite wall construction, the internal structural sidewalls 68, 70 and internal walls 62 may have a higher or lower effective stiffness than the hybrid outer walls 60, 72, 78, and therefore the junctions 92 will require an optimized angle that is different from about one-hundred and twenty (120) degrees that would typically be derived from homogeneous materials. The junction 92 angle and the internal wall thickness can be optimized based on specific material properties and hybrid wall construction.

Figure 6:
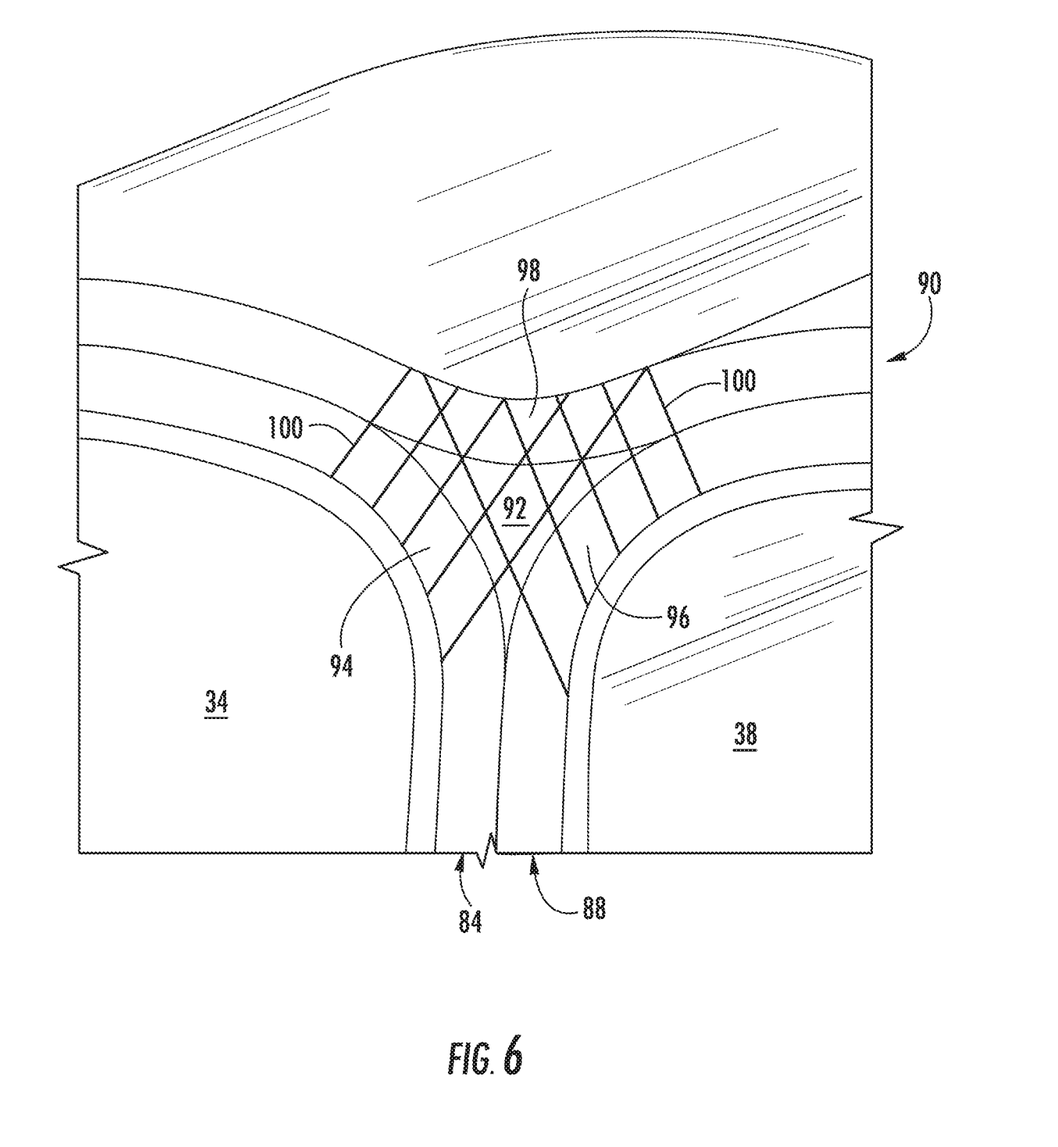
FIG. 6 is an enlarged perspective cross section of a junction of the pressure vessel assembly taken from circle 6 in FIG. 5.
Figure 7:
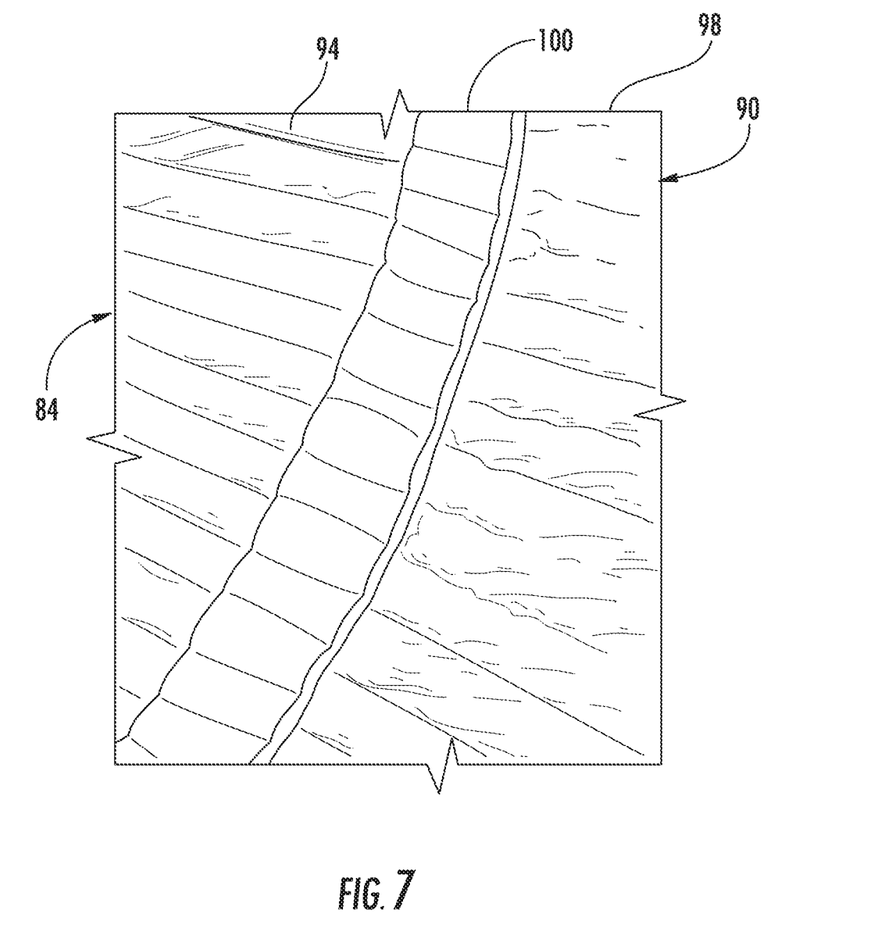
FIG. 7 is a plan view of a second embodiment of a cross-layered component located at the junction.

Referring to FIGS. 6 and 7, boundaries of the junction 92 may be defined by segments 94, 96, 98 of the respective layers 84, 88, 90. To reduce or alleviate the stress challenges that occur through and proximate to the junctions 92, the pressure vessel assembly 20 includes a cross-layered component 100. The cross-layered component 100 may extend directly between the segments 94, 98, directly between segments 96, 98, between segments 94, 98 and through the junction 92, and/or between segments 96, 98 and through the junction 92. It is contemplated and understood that other stitching patterns and/or combinations may be included and/or combined to strengthen the junction area. The cross-layered component 100 may be applied prior to the curing of any resin or matrix material as part of the layered composites.

Referring to FIG. 6 in one embodiment, the cross-layered component 100 may be small diameter rods that may be made of fiber-reinforced composites, metal, or other material having a degree of rigidity and strength. The rods 100 may be pinned through the thickness of various combinations of the segments 94, 96, 98 and the junction 92 (i.e., Z-pinned composite laminates). With the use of rods or Z-pins, the layers 84, 88, 90 may be a prepreg laminate. The diameter of the rods 100 may be greater than a diameter of the fibers in the composite layers 84, 88, 90, and may be within a range of about 0.2 to 1.0 millimeters. In one embodiment, the layers 84, 88, 90 may be formed and placed in contact with one another before a binding resin has cured. The resins may generally be 'sticky' while the rods 100 are pushed through the layers 84, 88, 90 and junction 92. With utilization of rods as the cross-layered component 100 and as one non-limiting example, the outer layer 90 may be made of a random chopped fiber or weaved fabric, and the inner layers 84, 86, 88 may be made of a continuously wound fiber or chopped fiber. It is further contemplated and understood that the inner and outer layers 84, 86, 88, 90 may be made of any fiber material including chopped fiber.

Referring to FIG. 7 in another embodiment the cross-layered component 100 may be a substantially pliable and generally continuous fiber that is used as a stitching engaging the outer layer 90 with the adjacent inner layers 84, 86, 88 proximate to the junctions 92. The material of the stitching 100 may be carbon, glass and/or aramid fiber. Alternatively, the inner layers 84, 86, 88 may be woven into the outer layer 90 proximate to the junctions 92 forming an inter-weave 100 (i.e., three dimensional fiber architecture) to enhance stress-carrying capability at the junction 92.

Figure 8:
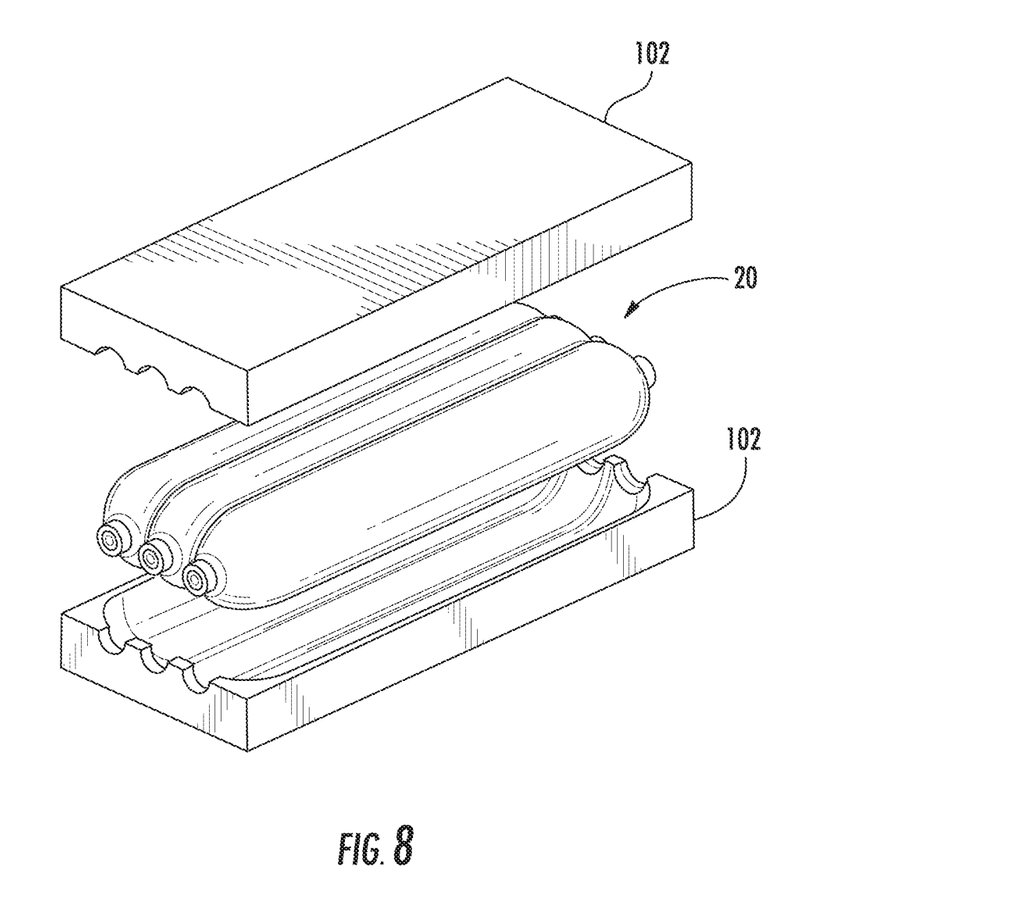
FIG. 8 is a perspective view of the pressure vessel assembly in conjunction with a pre-formed curing mold.

Referring to FIG. 8, after the outer layer 90 is applied and the cross-layered component 100 is added, the composite pressure vessel assembly 20 may be placed in a pre-formed pressure mold 102. Once in place, the chambers 40, 42, 44 defined by the respective liners 28, 30, 32 may be pressurized and the resins of the inner and outer layers 84, 86, 88, 90 allowed to cure under heat. It is further contemplated and understood that other curing methods for the outer layer 90 may be applied such as, for example, an autoclave or oven.

The composite pressure vessel assembly 20 may provide a lightweight storage tank(s) with a high energy storage density. The approach enables the easy addition of reinforcing composite material and a cross-layered component 100 where needed (e.g. junctions 92). The use of the hybrid continuous and short fiber may further minimize the vessel assembly weight. Because the vessel assembly 20 is in a non-cylindrical shape, the assembly will provide the highest conformability to a given space. Moreover, the composite construction will also provide corrosion resistance compared to metallic tanks.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A composite pressure vessel assembly comprising:
    a first vessel including a first inner layer;
    a second vessel including a second inner layer;
    an outer layer being in contact with and substantially enveloping the first and second inner layers;
    a junction having outer boundaries defined by segments of the first inner layer, the second inner layer and the outer layer; and
    a cross-layered component disposed in-part in and projecting through the junction, and disposed in-part in the first and second inner layers and the outer layer, wherein the cross-layered component is a plurality of stitchings adapted to engage the outer layer with at least one of the adjacent first and second inner layers.

2. The composite pressure vessel assembly set forth in claim 1, wherein the first vessel includes a first liner defining a first chamber and the first inner layer substantially envelopes the first liner, and wherein the second vessel includes a second liner defining a second chamber and the second layer substantially envelopes the second liner, and wherein the plurality of stitchings do not project into the first and second liners.

3. The composite pressure vessel assembly set forth in claim 2, wherein the first and second vessels are aligned side-by-side with a portion of the first inner layer in contact with a portion of the second inner layer.

4. The composite pressure vessel assembly set forth in claim 3, wherein the portions and segments of the first and second inner layers are not in direct contact with the outer layer.

5. The composite pressure vessel assembly set forth in claim 4, wherein the first and second liners are made of a formable polymer material.

6. The composite pressure vessel assembly set forth in claim 4, wherein the first and second liners are metallic.

7. The composite pressure vessel assembly set forth in claim 1, wherein the junction is generally centered to a Y-shaped seam.

8. The composite pressure vessel assembly set forth in claim 7, wherein the junction is made of the same material as the outer layer.

9. The composite pressure vessel assembly set forth in claim 1, wherein the cross-layered component includes a plurality of rods.

10. The composite pressure vessel assembly set forth in claim 9, wherein at least a portion of the plurality of rods extend through the outer layer, the junction, and into at least one of the first and second inner layers.

11. The composite pressure vessel assembly set forth in claim 10, wherein at least a portion of the plurality of rods extend through the outer layer and into the first inner layer.

12. The composite pressure vessel assembly set forth in claim 1, wherein the first and second inner layers are made of a generally continuous fiber, and the outer layer is made of a random fiber fabric.

13. The composite pressure vessel assembly set forth in claim 1, wherein the first and second inner layers are made of a generally continuous fiber, and the outer layer is made of a weaved fiber fabric.

14. The composite pressure vessel assembly set forth in claim 9, wherein the first and second inner layers and the outer layer form a prepreg laminate when the rods are inserted into the laminate.

15. A composite pressure vessel assembly comprising,
    a first vessel including a first inner layer;
    a second vessel including a second inner layer;
    an outer layer being in contact with and substantially enveloping the first and second inner layers;
    a junction having outer boundaries defined by segments of the first inner layer, the second inner layer and the outer layer; and
    a cross-layered component disposed in-part in the junction, disposed in-part in the first and second inner layers and disposed in-part in the outer layer, wherein the cross-layered component is an inter-weave disposed between the outer layer and at least one of the first and second inner layers.

16. A method of manufacturing a composite pressure vessel assembly comprising:
    enveloping a first liner with a first fiber composite layer;
    enveloping a second liner with a second fiber composite layer;
    placing the first and second liners side-by-side such that portions of the at least first and second fiber composite layers are in contact with one-another;
    enveloping the first and second fiber composite layers with a third fiber composite layer; and
    applying a cross-layered component generally at junctions of the pressure vessel defined by segments of the first, second, and third fiber composite layers, wherein the cross-layered component is a plurality of stitchings adapted to engage the outer layer with at least one of the adjacent first and second inner layers, and the plurality of stitchings do not extend into the first and second fiber composite layers.

17. The method set forth in claim 16 further comprising:
    curing a resin of the first, second, and third fiber composite layers after applying the cross-layered component.

18. The method set forth in claim 17, wherein the cross-layered component is Z-pins.

19. The method set forth in claim 17, wherein the plurality of stitchings are an inter-weave of fibers between the third fiber composite layer and at least one of the first and second fiber composite layers.

* * * * *